(12) United States Patent
Liu et al.

(10) Patent No.: US 11,728,056 B2
(45) Date of Patent: Aug. 15, 2023

(54) METHOD FOR DETECTING THICKNESSES OF COATING LAYERS OF NUCLEAR FUEL PARTICLES

(71) Applicants: Hunan University, Changsha (CN); China North Nuclear Fuel Co., Ltd, Baotou (CN)

(72) Inventors: Jian Liu, Changsha (CN); Chao Jiang, Changsha (CN); Yan Xiong, Changsha (CN); Hang Zhang, Changsha (CN); Zhaochuan Hu, Changsha (CN); Rong Li, Changsha (CN); Ning Chen, Changsha (CN)

(73) Assignees: HUNAN UNIVERSITY, Changsha (CN); CHINA NORTH NUCLEAR FUEL CO., LTD, Baotou (CN)

(*) Notice: Subject to any disclaimer, the term of this patent is extended or adjusted under 35 U.S.C. 154(b) by 45 days.

(21) Appl. No.: 17/779,175

(22) PCT Filed: Jul. 1, 2019

(86) PCT No.: PCT/CN2019/094207
§ 371 (c)(1),
(2) Date: May 24, 2022

(87) PCT Pub. No.: WO2020/252815
PCT Pub. Date: Dec. 24, 2020

(65) Prior Publication Data
US 2023/0126979 A1   Apr. 27, 2023

(30) Foreign Application Priority Data
Jun. 21, 2019 (CN) .......................... 201910542791.3

(51) Int. Cl.
  G21C 17/06   (2006.01)
  G01B 11/06   (2006.01)
  G21C 3/62    (2006.01)

(52) U.S. Cl.
  CPC .......... G21C 17/06 (2013.01); G01B 11/0616 (2013.01); G01B 11/0625 (2013.01); G21C 3/626 (2013.01)

(58) Field of Classification Search
  CPC .... G21C 17/06; G21C 3/626; G01B 11/0616; G01B 11/0625
  (Continued)

(56) References Cited

FOREIGN PATENT DOCUMENTS

CN     103778980 A    5/2014
CN     204719773 U    10/2015
(Continued)

OTHER PUBLICATIONS

Kim, "Nondestructive measurement of the coating thickness for simulated TRISO-coated fuel particles by using phase contrast X-ray radiography", Nuclear engineering and design 238, No. 12 (2008): 3285-3291. (Year: 2008).*

*Primary Examiner* — Jack W Keith
*Assistant Examiner* — Daniel Wasil
(74) *Attorney, Agent, or Firm* — IPro, PLLC

(57) ABSTRACT

A method for detecting the thicknesses of coating layers of nuclear fuel particles, comprising: collecting a surface image of a sample to be tested under a first amplification factor (S310); determining a testable particle in the surface image (S320); collecting a cross section image of the testable particle under a second amplification factor, wherein the second amplification factor is greater than the first amplification factor (S330); and determining the center of the testable particle in the cross section image and profile lines of all coating layers, and determining the thickness of (Continued)

each coating layer according to the center and the profile lines of each coating layer (S340). Also provided is a device for detecting the thicknesses of coating layers of the nuclear fuel particles.

10 Claims, 9 Drawing Sheets

(58) Field of Classification Search
USPC .................................................. 376/245, 248
See application file for complete search history.

(56) References Cited

FOREIGN PATENT DOCUMENTS

| | | | |
|---|---|---|---|
| CN | 106767458 A | 5/2017 | |
| CN | 108981624 A | 12/2018 | |
| WO | 2007050747 A1 | 5/2007 | |

\* cited by examiner ary method of the prior art, while ensuring detection efficiency and measurement accuracy, realizes automation
METHOD FOR DETECTING THICKNESSES OF COATING LAYERS OF NUCLEAR FUEL PARTICLES

TECHNICAL FIELD

The present invention relates to a technical field of measurement and detection, and in particular, to a method and device for detecting thicknesses of coating layers of nuclear fuel particles.

BACKGROUND

As a clean and efficient new energy, nuclear energy has been widely used in many countries and has far-reaching influence on military, economy, society, politics, etc. With the rapid development of economy of China and the gradual exhaustion of fossil energy, large-scale application of nuclear energy will become an inevitable choice. The first high-temperature gas-cooled reactor (HTR) nuclear power plant with characteristics of the fourth-generation nuclear plant in the world, independently developed by China, starts construction at the end of 2012, which is different from the pressurized water reactor (PWR) technology adopted by the third-generation nuclear power plant, the general pressurized water reactor nuclear power plant can provide heat energy of about 300° C., and the high-temperature gas-cooled reactor can reach 750° C., which greatly improves the power generation efficiency; moreover, the high-temperature gas-cooled reactor nuclear power plant has good inherent safety.

A nuclear fuel particle is the smallest unit in the fuel ball of the high-temperature gas-cooled reactor, which is composed of UO2 kernel and its outer coating layer, the coating layer is composed of four layers of pyrolytic carbon and silicon carbide with different thickness and density. The diameter of the nuclear fuel particle is less than 1 mm, in which the diameter of UO2 kernel is less than 0.5 mm, and the thickness of each coating layer is only 20~140 μm. The size of UO2 kernel and the thickness of each coating layer directly affect the efficiency and safety of reactor operation. Therefore, it is crucial to accurately measure the thickness of each coating layer of the nuclear fuel particles in each batch.

At present, the main methods used to measure the thicknesses of coating layers of the nuclear fuel particles are X-ray microscopic imaging method, V-groove method, metallographic method, particle size analyzer method, etc. Comprehensively considering the detection cost, detection efficiency, detection accuracy and the demand for the detection environment, the metallographic method is the most suitable for industrial application. The metallographic method usually uses resin to wrap the nuclear fuel particles, and makes the nuclear fuel particles expose the kernel and each coating layer by grinding, to make grinding plates. The surfaces of the plates are observed manually by microscope, and the complete nuclear fuel particles in good grinding state are selected, then, three points are marked on the boundary of each coating layer to fit a circle as the boundary of each layer, a ray is made outwardly through the center of the circle, and the distances between intersections of the ray and the boundaries are taken as the thickness of each layer. The detection method is mainly carried out manually, with poor automation and low measurement accuracy. In addition, nuclear radiation may endanger the physical health of detection workers.

SUMMARY

For this purpose, the present invention provides a method and device for detecting the thicknesses of the coating layers of the nuclear fuel particles, to try to solve or at least alleviate the above problems.

According to a first aspect of the present invention, a method for detecting the thicknesses of the coating layers of the nuclear fuel particles is provided, which comprising: capturing an image of a surface of a sample to be measured at a first magnification, the surface of the sample to be measured including sections of a plurality of nuclear fuel particles; determining a measurable particle in the image of the surface, wherein the measurable particle is a nuclear fuel particle of which sectional area is greater than a first threshold and average spacing from surrounding particles is less than a second threshold; capturing an image of a section of the measurable particle at a second magnification, wherein the second magnification is greater than the first magnification; determining a center and a contour line of each coating layer of the measurable particle in the image of the section, and determining thickness of the each coating layer according to the center and the contour line of the each coating layer.

Alternatively, in the method for detecting the thicknesses of the coating layers of the nuclear fuel particles according to the present invention, before the capturing of the image of the first surface of the sample to be measured, the method further comprises: capturing an image of an edge of the sample to be measured, at a third magnification, wherein the third magnification is less than the first magnification; determining a position of a center of the sample to be measured according to the image of the edge, and moving the center of the sample to be measured to a center of a visual field of a microscope.

Alternatively, in the method for detecting the thicknesses of the coating layers of the nuclear fuel particles according to the present invention, the capturing of the image of the surface of the sample to be measured at the first magnification comprises: dividing the surface of the sample to be measured into a plurality of regions, and capturing sequentially an image of surface of each of the regions at the first magnification in a preset order.

Alternatively, in the method for detecting the thicknesses of the coating layers of the nuclear fuel particles according to the present invention, the surface of the sample to be measured is divided into the plurality of equal regions, and the image of the surface of each of the regions is captured sequentially at the first magnification, starting from a central region, in a clockwise or anticlockwise order.

Alternatively, in the method for detecting the thicknesses of the coating layers of the nuclear fuel particles according to the present invention, the determining of the thickness of the each coating layer according to the center and the contour line of the each coating layer comprises: making at least one ray from the center, the ray intersecting each contour line at each point, respectively; taking an average value of intersection distances corresponding to a coating layer as the thickness of this coating layer, wherein the intersection distance is a distance between an outer intersection and an inner intersection, the outer intersection being an intersection of the ray and an outer contour line of the coating layer, and the inner intersection being an intersection of the ray and an inner contour line of the coating layer.

Alternatively, in the method for detecting the thicknesses of the coating layers of the nuclear fuel particles according to the present invention, two mutually perpendicular straight lines are made across the center, the straight lines intersecting with each contour line at each point, respectively; taking the average value of the intersection distances corresponding to the coating layer as the thickness of this coating layer.

Alternatively, in the method for detecting the thicknesses of the coating layers of the nuclear fuel particles according to the present invention, after the determining of the thickness of the each coating layer according to the center and the contour line of the each coating layer, further comprises: judging whether the thickness of the coating layer is abnormal; rechecking the measurable particle when the thickness of the coating layer is abnormal.

Alternatively, in the method for detecting the thicknesses of the coating layers of the nuclear fuel particles according to the present invention, the rechecking of the measurable particle comprises: capturing an image of a local section of the measurable particle at a fourth magnification, wherein the fourth magnification is greater than the second magnification; determining a center and contour line of each coating layer of the measurable particle in the image of the local section, making one ray from the center, the ray intersecting with the each contour line at each point, respectively; taking an intersection distance corresponding to a coating layer as the thickness of this coating layer.

Alternatively, in the method for detecting the thicknesses of the coating layers of the nuclear fuel particles according to the present invention, the abnormal comprises: an absolute value of a difference between the thickness of one coating layer of the measurable particle and an average value of thickness of the same coating layer of other measurable particles is greater than a third threshold.

Alternatively, in the method for detecting the thicknesses of the coating layers of the nuclear fuel particles according to the present invention, the method further comprises: storing the captured images and the measured relevant data in a detection process in a database.

According to a second aspect of the present invention, a device for detecting thicknesses of coating layers of nuclear fuel particles is provided, which comprises: a microscope, an industrial camera and a computing apparatus, the industrial camera being connected to the microscope and the computing apparatus, respectively; the microscope comprises an electronic control objective table and an electronic control converter, the electronic control objective table being used to carry the sample to be measured, and a plurality of objective lenses with different magnifications being disposed on the electronic control converter; the electronic control objective table and the electronic control converter are connected to the computing apparatus, respectively, and the computing apparatus is suitable for controlling positions of the electronic control objective table and the electronic control converter according to program instructions, thereby adjusting a position of the sample to be measured and switching the objective lenses; the industrial camera is suitable for capturing images of the sample to be measured and transmitting the images to the computing apparatus, so that the computing apparatus determines the thicknesses of the coating layers of the nuclear fuel particles according to images.

Alternatively, in the device for detecting the thicknesses of the coating layers of the nuclear fuel particles according to the present invention, the computing apparatus comprises: at least one processor and a memory storing the program instructions; the program instructions, when read and executed by the processors, cause the device for detecting the thicknesses of the coating layers of the nuclear fuel particles to perform the method for detecting the thicknesses of the coating layers described as above.

The scheme for detecting the thicknesses of the coating layers of the nuclear fuel particles of the present invention may automatically capture the image of the surface of the sample to be measured at the first magnification and select the measurable particle that meets the measurement requirements; then, capture the image of the section of the measurable particle at a higher magnification (the second magnification), from which the center and the contour line of the each coating layer of the measurable particle are extracted, and the thickness of the each coating layer is determined according to the center and contour line. The scheme for detecting thicknesses of coating layers of nuclear fuel particles of the present invention implements automatic detection of the thickness of the each coating layer, and compared with the existing technology, the degree of automation, measurement efficiency and measurement accuracy have been greatly improved, which can provide more accurate measurement data for nuclear reactor parts and avoid radiation damage to detection workers.

The above description is only an overview of the technical scheme of the present invention. In order to better understand the technical means of the present invention, it may be implemented according to the contents of the specification, and in order to make the above and other purposes, features and advantages of the present invention more obvious and understandable, the specific implementation mode of the present invention is given below.

BRIEF DESCRIPTION OF FIGURES

In order to achieve the above and related purposes, certain illustrative aspects are described herein in combination with the following description and drawings. These aspects indicate various ways in which the principles disclosed herein may be practiced, and all aspects and their equivalent aspects are intended to fall within the scope of the claimed subject matters. The above and other objects, features and advantages of the present disclosure will become more apparent by reading the following detailed description in combination with the accompanying drawings. Throughout the present disclosure, the same reference numerals generally refer to the same parts or elements.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be embodied in various forms and should not be limited by the embodiments set forth herein. On the contrary, these embodiments are provided to enable a more thorough understanding of the present disclosure and to fully convey the scope of the present disclosure to those skilled in the art.

Figure 1:
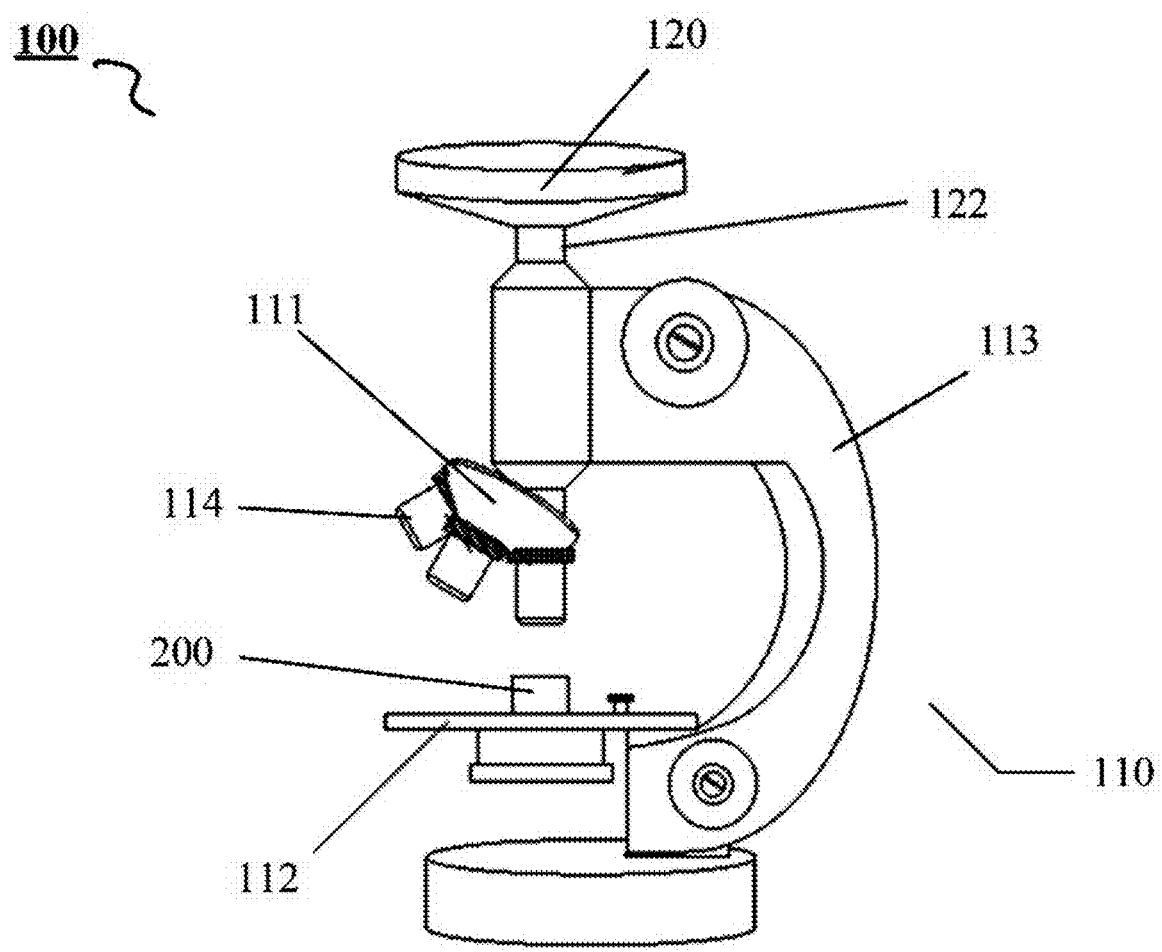
FIG. 1 shows a schematic diagram of a device 100 for detecting thicknesses of coating layers of nuclear fuel particles according to an embodiment of the present invention.

FIG. 1 shows a schematic diagram of a device 100 for detecting thicknesses of coating layers of nuclear fuel particles according to an embodiment of the present invention, and the device 100 may realize automatic detection of the thickness of each coating layer of nuclear fuel particles. As shown in FIG. 1, the device 100 comprises a microscope 110, an industrial camera 120 and a computing apparatus 130 (the computing apparatus 130 is not shown in FIG. 1).

The microscope 110 may be of any model, and the present invention does not limit the manufacturer and the model of the microscope 110. As shown in FIG. 1, in the embodiment of the present invention, the microscope 110 comprises an electronic control converter 111 and an electronic control objective table 112.

A plurality of objective lenses 114 with different magnifications are disposed on the electronic control converter 111. By turning the electronic control converter 111, the switching of the objective lenses 114 may be embodied, thereby adjusting the magnification of the microscope 110. The present invention does not limit the number and the magnification of the objective lenses 114. Preferably, the microscope 110 includes four objective lenses 114, of which magnifications are 2×, 5×, 10× and 40×, respectively.

The electronic control objective table 112 is used to carry a sample 200 to be measured. By adjusting a position of the electronic control objective table 112 in X, Y and Z axises of space, the automatic focusing of the objective lenses 114 and the industrial camera 120 may be embodied and the position of the sample 200 to be measured in a visual field of the microscope may be adjusted. It should be noted that the present invention does not limit travel ranges of the electronic control objective table 112 in the X, Y and Z axises. According to one embodiment, the electronic control objective table 112 has a stroke equal to or greater than 50 mm in each of X axis and Y axis direction, and a stroke equal to or greater than 10 mm in the Z axis direction.

The sample 200 to be measured includes a plurality of nuclear fuel particles, and its surface includes sections of the plurality of nuclear fuel particles. The embodiment of the present invention may detect the thickness of each coating layer of the nuclear fuel particles by capturing images of the surface of the sample 200 at different magnifications, and analyzing and processing the captured images. The sample 200 to be measured, for example, may be made by adopting the mounting and grinding process, that is, firstly, the nuclear fuel particles are poured into the mounting die, so that the nuclear fuel particles are tightly arranged. Then, the curing agent is poured into the mounting die, and the nuclear fuel particles are fixed and wrapped in the curing agent by adopting the mounting process, to form a solid sample with the same shape as the die. The curing agent may be a material such as resin and so on, but is not limited thereto. Then, the surface of the solid sample is ground to make the nuclear fuel particles expose a kernel and each coating layer (that is, to appear sections of the plurality of nuclear fuel particles), so as to the sample 200 to be measured is made. It should be noted that, the shape and size of sample 200 to be measured may be any shape and size. Specifically, the shape and size of the sample 200 to be measured are determined by the shape and size of the mounting die and the amount of sample material removed during the grinding process. The present invention does not limit the shape and size of sample 200 to be measured. In the following (embodiments of FIGS. 4~6 and 8~10), a scheme for detecting the thicknesses of the coating layers of the present invention is illustrated by taking the sample 200 to be measured being a cylindrical sample with a certain height as an example.

In addition, it should be noted that the nuclear fuel particles included in the sample 200 to be measured may be of any structure or material, and the present invention does not limit the type of kernel, and the number, thicknesses and material of the coating layers of the nuclear fuel particles. In the following (embodiments of FIGS. 4-6 and 8-10), a nuclear fuel particle with four coating layers is taken as an example, to illustrate a scheme for detecting the thicknesses of the coating layers of the present invention.

The industrial camera 120 may be any model, and the present invention does not limit the manufacturer and model of the industrial camera 120. For example, an industrial camera 120 may have a sensor chip of 1-inch, 12 million real physical pixels, resolution of 4000*3000, a camera interface of type C, and frame rate of 15 frames per second. The industrial camera 120 is connected to the microscope 110 and the computing apparatus 130, respectively. For example, the industrial camera 120 is connected to the microscope 110 through a camera interface 122, and to the computing apparatus 130 through a data cable such as USB and so on. The industrial camera 120 is used to capture images of the sample to be measured amplified by the microscope 110, and transmits the images to the computing apparatus 130 for image processing, to detect the thickness of each of the coating layers of the nuclear fuel particles.

The computing apparatus 130 may be any apparatus with storage and computing abilities, for example, it may be a personal configured computer such as a desktop computer, a notebook computer and so on, it may also be a computer, which has a higher hardware configuration, such as a workstation, server and so on, it may also be a mobile terminal such as a mobile phone, a tablet computer, a smart wearable apparatus and so on, but is not limited thereto.

In an embodiment of the present invention, the industrial camera 120, the electronic control converter 111 and the electronic control objective table 112 are connected to the computing apparatus 130, respectively. The computing apparatus 130 may control the position of the electronic control converter 111 and the electronic control objective table 112 according to program instructions, so as to switch the objective lenses 114 and adjust the position of the sample 200 to be measured. The industrial camera 120 is suitable for capturing images of samples to be measured at different magnifications, transmits the images to the computing apparatus 130, and the computing apparatus 130 analyzes and processes the images based on the preset program instructions and determines the thicknesses of the coating layers of the nuclear fuel particles according to the images.

Figure 2:
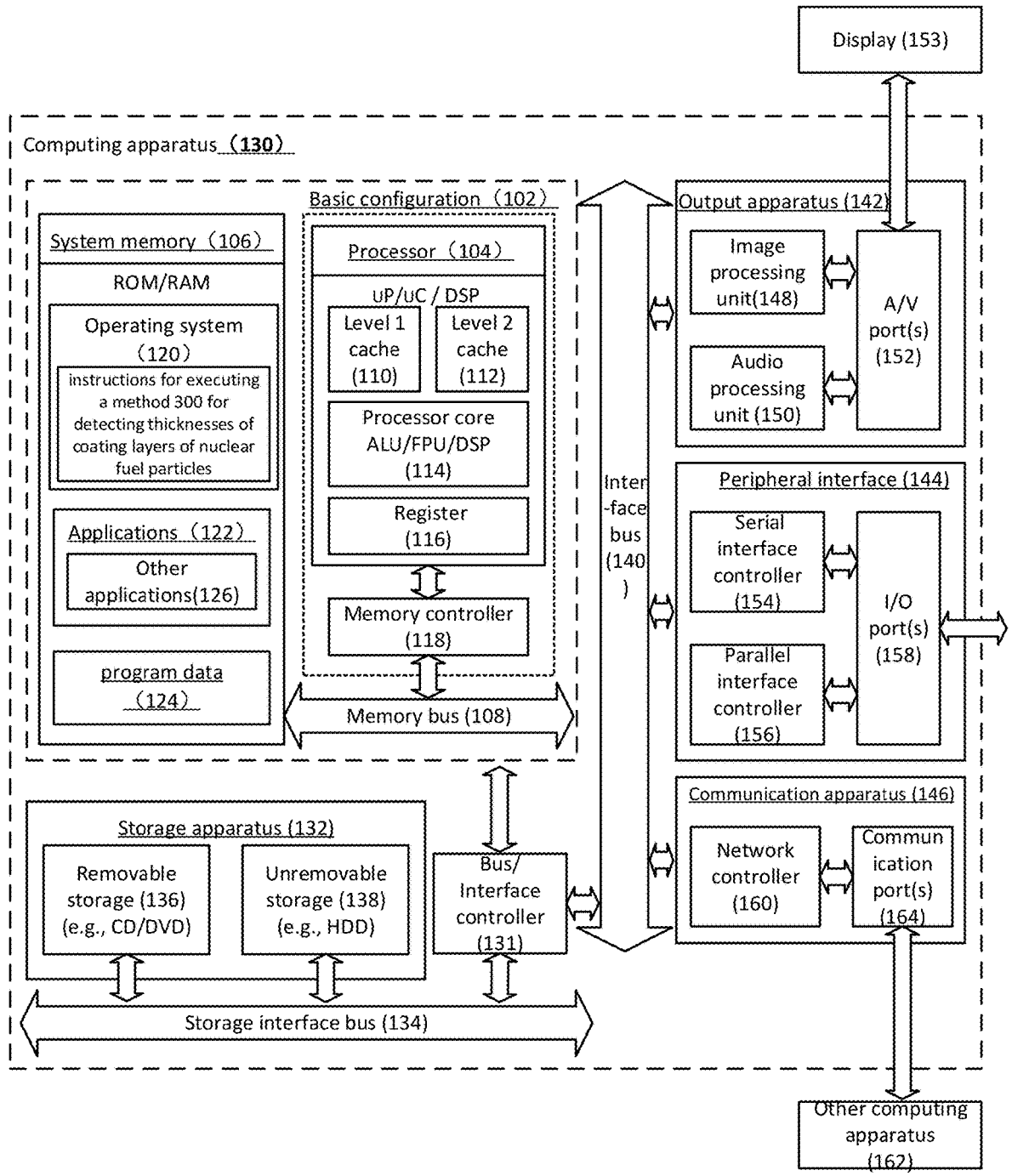
FIG. 2 shows a schematic diagram of a computing apparatus 130 according to an embodiment of the present invention.

FIG. 2 shows a schematic diagram of a computing apparatus 130 according to an embodiment of the present invention. It should be noted that the computing apparatus 130 shown in FIG. 2 is only an example. In practice, a computing apparatus used to implement a method for detecting thicknesses of coating layers of nuclear fuel particles of the present invention may be any type of apparatus, and its hardware configuration may be the same as that shown in FIG. 2, or different from that shown in FIG. 2. In practice, hardware components of the computing apparatus used to implement the method for detecting the thicknesses of the coating layers of the nuclear fuel particles of the present invention may be more than or less than these of the computing apparatus 130 shown in FIG. 2, and the present invention does not limit the specific hardware configuration of the computing apparatus.

As shown in FIG. 2, in a basic configuration 102, the computing apparatus 130 typically comprises a system memory 106 and one or more processors 104. A memory bus 108 may be used for a communication between the processor 104 and the system memory 106.

Depending on a desired configuration, the processor 104 may be any type of processor, including but not limited to, a microprocessor (μP), a microcontroller (μC), a digital information processor (DSP), or any combination thereof. The processor 104 may include one or more levels of caches such as level 1 cache 110 and level 2 cache 112, a processor core 114, and a register 116. The exemplary processor core 114 may include an arithmetic logic unit (ALU), a float point unit (FPU), a digital signal processing core (DSP core), or any combination thereof. An exemplary memory controller 118 may be used with the processor 104, or in some implementations, the memory controller 118 may be an internal part of the processor 104.

Depending on the desired configuration, the system memory 106 may be any type of memory including, but not limited to, a volatile memory (such as RAM) and a non-volatile memory (such as a ROM, a flash memory, etc.), or any combination thereof. The system memory 106 may include an operating system 120, one or more applications 122, and program data 124. In some embodiments, the application 122 may be arranged to execute instructions on the operating system by the one or more processors 104 using the program data 124.

The computing apparatus 130 may also include an interface bus 140 that facilitates communication from various interface apparatuses (for example, an output apparatus 142, a peripheral interface 144, and a communication apparatus 146) to the basic configuration 102 via a bus/interface controller 131. The exemplary output apparatus 142 includes a graphics processing unit 148 and an audio processing unit 150. They may be configured to facilitate communication with various external apparatuses such as a display or a speaker via one or more A/V ports 152. The exemplary peripheral interface 144 may include a serial interface controller 154 and a parallel interface controller 156, and the serial interface controller 154 and the parallel interface controller 156 may be configured to facilitate communication via one or more I/O ports 158 and peripheral apparatuses such as input apparatuses (e.g., a keyboard, a mouse, a pen, a voice input apparatus, a touch input apparatus) or other peripherals (e.g. a printer, a scanner, etc.). The exemplary communication apparatus 146 may include a network controller 160, which may be arranged to facilitate communication with one or more other computing apparatuses 162 through a network communication link via one or more communication ports 164.

The network communication link may be an example of a communication medium. The communication medium may generally be embodied as computer-readable instructions, data structures, program modules in a modulated data signal such as a carrier wave or other transmission mechanism, and may include any information delivery medium. The "modulated data signal" may be a signal in which change of one or more of its data set, or its change may be performed in a manner of encoding information in the signal. As a non-limiting example, the communication medium may include a wired medium such as a wired network or a private wire network, and various wireless medium such as sound, radio frequency (RF), microwave, infrared (IR), or other wireless mediums. The term of computer-readable medium used herein may include both a storage medium and the communication medium.

In the computing apparatus 130 according to the present invention, the application 122 includes instructions for executing a method 300 for detecting the thicknesses of the coating layers of the nuclear fuel particles, and the instructions may instruct the device 100 for detecting the thicknesses of the coating layers of the nuclear fuel particles described as above to perform the method 300 for detecting the thicknesses of the coating layers of the nuclear fuel particles of the present invention, in which the automatic detection of the coating layer thickness is embodied by capturing the images of the sample to be measured at different magnifications of the microscope via automatically switching the objective lenses, automatically focusing, and automatically adjusting the position of the sample to be measured, and analyzing and processing the images to determine the thickness of each of the coating layers of the nuclear fuel particles.

Figure 3:
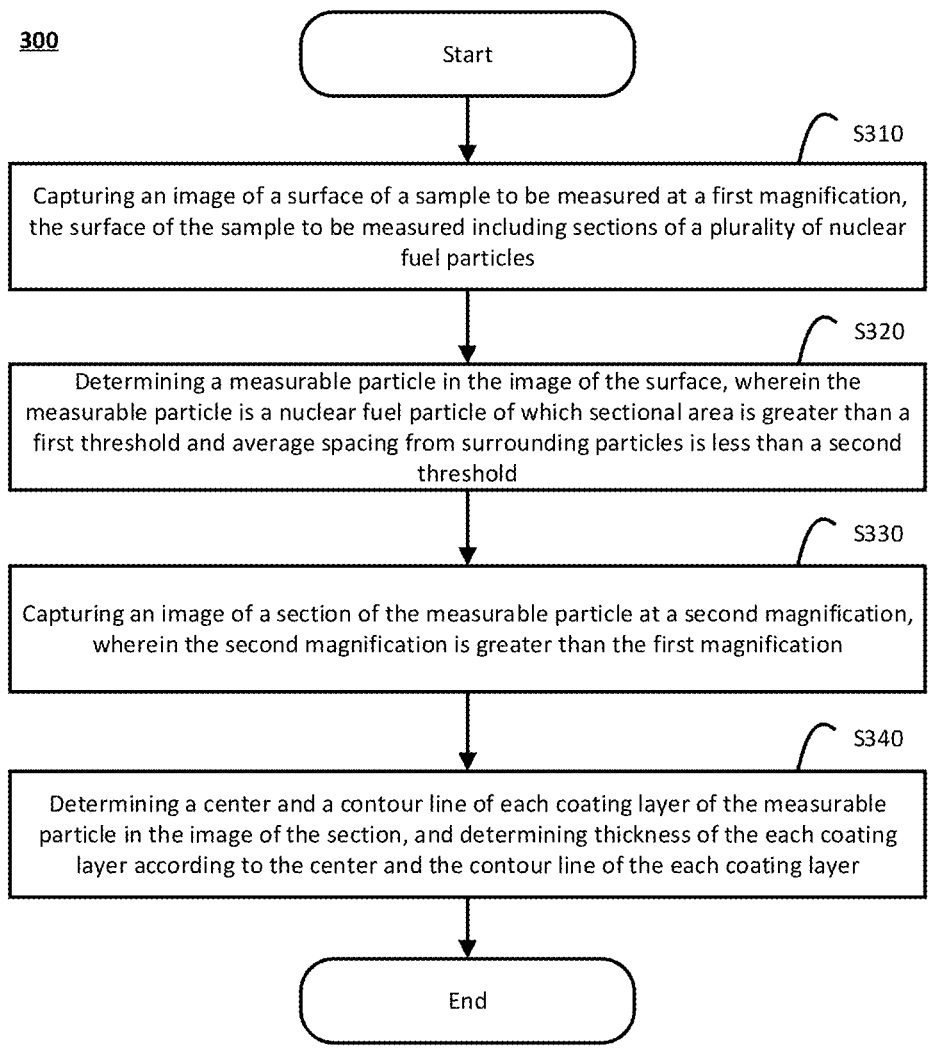
FIG. 3 shows a flowchart of a method 300 for detecting thicknesses of coating layers of nuclear fuel particles according to an embodiment of the present invention.

FIG. 3 shows a flowchart of a method 300 for detecting thicknesses of coating layers of nuclear fuel particles according to an embodiment of the present invention. The method 300 is performed by the device 100 for detecting the thicknesses of the coating layers of the nuclear fuel particles described as above. As shown in FIG. 3, the method 300 starts at step S310.

In the step S310, an image of a surface of a sample to be measured is captured at a first magnification, wherein the surface of the sample to be measured includes sections of a plurality of nuclear fuel particles.

According to one embodiment, the sample to be measured is a cylindrical sample made from mounting and grinding of the plurality of nuclear fuel particles, and kernels and the respective coating layers of the plurality of nuclear fuel particles are exposed on the surface of the sample to be measured due to the grinding, that is, the sections of the plurality of nuclear fuel particles are exposed.

It should be noted that, in the image of the surface captured at the first magnification, it should be possible to show the sections of the plurality of nuclear fuel particles. The present invention does not limit the specific value of the first magnification, and those skilled in the art may select an objective lens with an appropriate magnification according to an actual size of the nuclear fuel particle, so that the sections of the plurality of nuclear fuel particles may be displayed in the image of the surface. For example, in an embodiment, the diameter of the nuclear fuel particle is about 1 mm, accordingly, an objective lens with a diameter of an imaging visual field of about 4 mm and a magnification of 5× (i. e., the first magnification is 5) may be used, and meanwhile, the image of the surface of the sample to be measured captured by an industrial camera will include the sections of the plurality of nuclear fuel particles.

Specifically, in the step S310, firstly, the sample to be measured is fixed on the electronic control objective table 112 through a structure such as a glass slide, a fixture and so on. Then, according to program instructions preset in the computing apparatus 130, the electronic control converter 111 is automatically adjusted to switch the objective lens directly facing the objective table to an objective lens with the first magnification. The position of the electronic control objective table 112 is automatically adjusted to move the sample to be measured into the visual field of the objective lens, and automatic focusing is carried out, so that the industrial camera 120 may show a clear image of the surface of the sample surface to be measured. Then, the industrial camera 120 captures the image of the surface of the sample to be measured, and transmits the captured image of the surface to the computing apparatus 130 for analysis and processing.

Then, the compute device 130 performs step S320.

In the step S320, a measurable particle in the image of the surface is determined, wherein the measurable particle is a nuclear fuel particle of which sectional area is greater than a first threshold and average spacing from surrounding particles is less than a second threshold.

Integrity of the nuclear fuel particle may be determined by judging whether the sectional area is larger than the first threshold, that is, whether spalling of the kernel and the coating layer occurs in the nuclear fuel particle during the grinding process may be judged. By judging whether the average spacing between the nuclear fuel particle and surrounding particles is less than the second threshold, it may be judged that whether the grinding state of the nuclear fuel particle is good, i.e., whether undergrinding or overgrinding occurs. In a good grinding state, the section of the nuclear fuel particle should pass through a center of sphere of the nuclear fuel particle or be at a distance very closing to the center of the sphere.

According to one embodiment, the step S320 may be further implemented by following steps S322 to S326:

In the step S322, position of the each nuclear fuel particle is determined by determining a center of the each nuclear fuel particle in the image of the surface.

According to an embodiment, the image of the surface may be converted to a grayscale image, and further converted to a binary image. Morphological processing (such as morphological opening operation, etc.) is carried out on the binary image to eliminate outliers, burrs and subtle adhesion between structures in the binary image, so that a plurality of separate and individual nuclear fuel particles are appeared in the binary image. Then, a shape detection algorithm (such as Hough transform algorithm) is adopted to identify circular contours in the binary image and determine center thereof.

Then, in the step S324, whether the sectional area of the nuclear fuel particle is greater than the first threshold is determined.

According to one embodiment, image of each particle may be cropped with a cropping rectangle in an equal size centered on the center of each particle determined in step S322, and whether the sectional area of the corresponding nuclear fuel particle is greater than the first threshold may be determined according to the cropped image. The size of the cropping rectangle may be determined according to the actual size of the nuclear fuel particle, and in one embodiment, the size of the cropping rectangle may be set to be slightly larger than a bounding rectangle of the nuclear fuel particle. For example, the section of the nuclear fuel particle is about a circle with a diameter of 1 mm and its bounding rectangle is a square of 1 mm*1 mm, and accordingly, the cropping rectangle may be set to a square of 1.2 mm*1.2 mm.

According to an embodiment, the cropped image of the single nuclear fuel particle is binarized to obtain the binary image.

Figure 4:
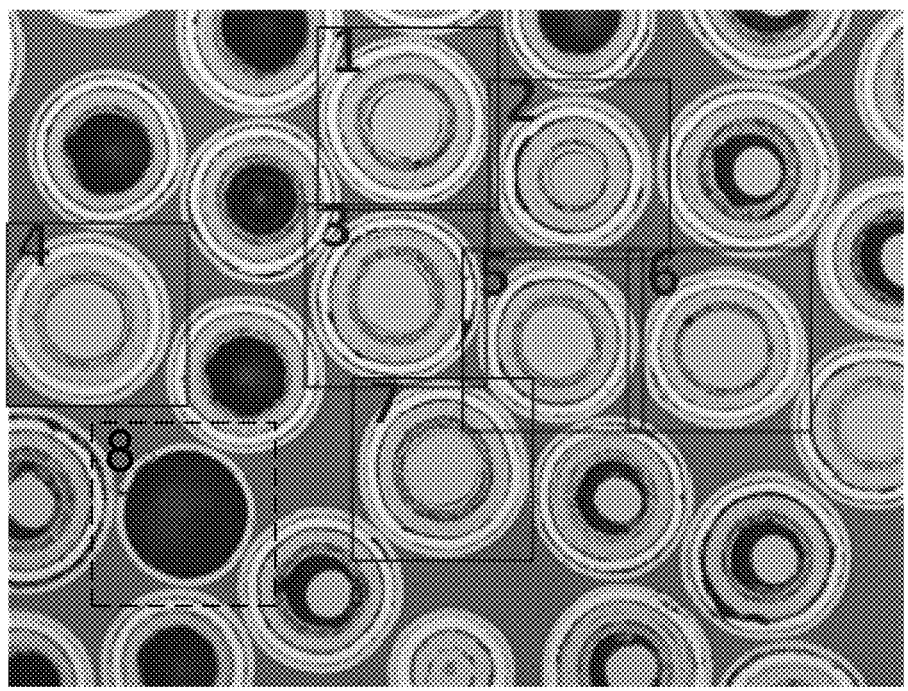
FIG. 4 shows a schematic diagram of a image of a surface of a sample to be measured, captured at a first magnification according to an embodiment of the present invention.

If the structure of the nuclear fuel particle is complete, the particle is presented as a bright area in the original image of the surface. As shown in FIG. 4, nuclear fuel particles in solid rectangle boxes 1~7 are complete particles. After binarization of the image of the complete nuclear fuel particle, the nuclear fuel particle will appear as one white circle in the binary image.

If the kernel or the coating layer of the nuclear fuel particle is spalled during the grinding process, the spalled part of the nuclear fuel particle is presented as a dark area in the original image of the surface. As shown in FIG. 4, the nuclear fuel particle in a dotted rectangular box 8 is an incomplete particle, and its kernel and three inner coating layers are spalled during the grinding process. After the binarization of the image of the incomplete nuclear fuel particle, the spalled part will be presented as black in the binary image, and accordingly, the whole nuclear fuel particle will not be presented as one white circle, but be presented as one white circular ring, or completely be presented black.

Then, the number of pixels with the pixel value of 1 in the binary image is calculated, that is, the area of the white area in the binary image is calculated, and the calculated result is used as the sectional area of the nuclear fuel particle. Then, whether the sectional area is greater than the first threshold is judged, if the sectional area is greater than the first threshold, it indicates that the structure of the nuclear fuel particle is complete, the step S326 is continued to further judge whether the average spacing between the nuclear fuel particle and surrounding particles is greater than the second threshold, that is, judge whether the grinding state of the nuclear fuel particle is good. If the sectional area is less than or equal to the first threshold value, it indicates that the nuclear fuel particle is incomplete and the particle is judged to be an immeasurable particle. It should be noted that the first threshold value may be set by those skilled in the art by referring to the actual size of the nuclear fuel particle, and the present invention does not limit the value of the first threshold value.

In the step S326, whether the average spacing between the complete nuclear fuel particle and surrounding particles is less than the second threshold is judged.

Figure 5:
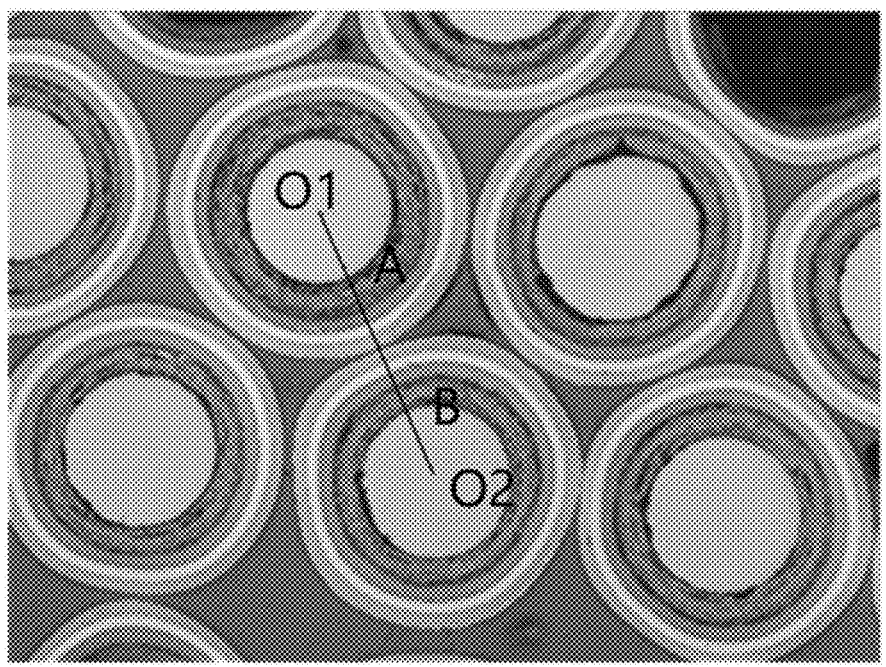
FIG. 5 shows a schematic diagram of spacing between two nuclear fuel particles according to an embodiment of the present invention.

The spacing between two nuclear fuel particles is the minimum distance from a point on contour of the outermost layer of one particle to a point on contour of the outermost layer of another particle. Specifically, line segment O1O2 may be obtained by connecting centers of circles O1 and O2 of two nuclear fuel particles when measuring the spacing between the two particles. The line segment O1O2 intersects with the contours of the outermost layers of the two particles at point A and point B, respectively, and the distance from point A to point B is the spacing between the two particles. For example, as shown in FIG. 5, the centers of circles of the two nuclear fuel particles are O1 and O2, respectively, and the line segment O1O2 intersects with the contours of the outermost layers of the two particles at points A and B, respectively. The coordinates of point A and point B in the image are (1128, 987) and (1133, 998) respectively. The distance from point A to point B is calculated as 12.08 px according to coordinates thereof.

Those skilled in the art may understand that, there are usually a plurality of surrounding particles around one nuclear fuel particle. In this case, the spacing between this nuclear fuel particle and each surrounding particle is calculated respectively, so as to obtain a plurality of spacings. Then, the average value of the plurality of spacings is calculated, that is, the average spacing is calculated. Then, whether the average spacing is less than the second threshold is judged. If the average spacing is less than the second threshold, it indicates that the grinding state of the fuel particle is good and the particle is determined to be measurable; if not, it indicates that the fuel particle is undergrinding or overgrinding, and the particle is determined to be immeasurable.

It should be noted that the second threshold may be set by those skilled in the art, and the present invention does not limit the value of the second threshold. In addition, the present invention does not limit the unit of the second threshold, but the unit of the second threshold should be consistent with the unit of the average spacing measured in the step S320. For example, if the unit of the average spacing is px (pixel), the unit of the second threshold should also be px; according to the pixel equivalent, after a pixel distance is converted into a length distance, if the unit of the average spacing is the length unit of μm, nm and so on, the unit of the second threshold value should also be the length unit of μm, nm and so on.

After step S320, the measurable particle in the image of the surface may be determined. For example, as shown in FIG. 4, the nuclear fuel particles in the solid rectangle boxes 1~7 are the measurable particles.

After the measurable particle in the image of the surface is determined, the step S330 is carried out.

In the step S330, an image of the section of measurable particle is captured at a second magnification, wherein the second magnification is greater than the first magnification.

It should be noted that in the image of the section captured at the second magnification, it should be possible to clearly and completely show a section of one measurable particle, and preferably, only one measurable particle section may be shown. The present invention does not limit the specific value of the second magnification. Those skilled in the art may select an objective lens with an appropriate magnification according to the actual size of the nuclear fuel particle, so that the image of the section may show only a complete section of one measurable particle. For example, in an embodiment, the diameter of the nuclear fuel particle is about 1 mm, and accordingly, an objective lens with a diameter of an imaging visual field of about 1.5 mm and a magnification of 10× (i. e., the second magnification is 10) may be used. At this time, the image of the section of the measurable particle captured by the industrial camera will contain only the section of one measurable particle.

Specifically, in the step S330, according to the program instructions preset in the computing apparatus 130, the electronic control converter 111 is automatically adjusted to switch the objective lens directly facing the objective table to an objective lens with the second magnification. Then, the position of the electronic control objective table 112 is automatically adjusted to move the measurable particle to the visual field of the objective lens, and automatic focusing is carried out, so that the industrial camera 120 may present a clear image of the measurable particle. Then, the industrial camera 120 captures the image of the section of the measurable particle and transmits the captured image to the computing apparatus 130 for analysis and processing.

Then, the computing apparatus 130 performs the step S340.

In the step S340, a contour line of each of coating layers and a center of the measurable particle in the image of the section are determined, and the thickness of the each coating layer is determined according to the center and contour line of the each coating layer.

The center and the contour line of the each coating layer of the measurable particle may be determined by a shape detection algorithm. The shape detection algorithm may be Hough Transform algorithm, Radon Transform algorithm and so on, but not limited to thereto.

According to one embodiment, after the center and the contour line of the each coating layer of the measurable particle are determined, the thickness of the each coating layer may be determined by following steps S342 and S344:

In the step S342, at least one ray is made from the center of the measurable particle, and each ray intersects with each contour line at each point, respectively.

Figure 6:
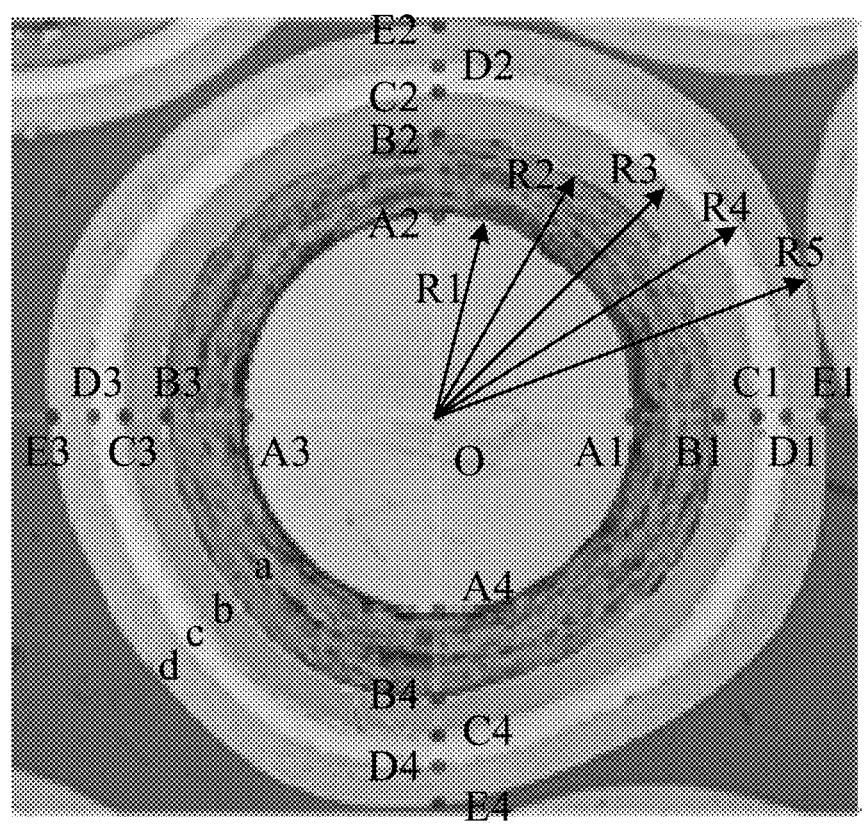
FIG. 6 shows a schematic diagram of a image of a section of a measurable particle captured at a second magnification according to an embodiment of the present invention.

It should be noted that the present invention does not limit the number or direction of the rays made in the step S342. According to one embodiment, as shown in FIG. 6, two mutually perpendicular straight lines may be made across a central point O, and the two lines intersect with the each contour line at points A1~E1, A1~E2, A3~E3 and A4~E4, respectively. In other words, four rays are made across the center, and an included angle between adjacent rays is 90°, and these four rays intersect with the each contour line at the each point, respectively.

Then, in the step S344, the average value of the intersection distances corresponding to the coating layer is taken as the thickness of this coating layer, wherein the intersection distance is a distance between an outer intersection and an inner intersection, the outer intersection is an intersection of the ray and an outer contour line of the coating layer, and the inner intersection is an intersection of the ray and an inner contour line of the coating layer.

For example, as shown in FIG. 6, the measurable particle includes four coating layers, which are coating layer a, coating layer b, coating layer c and coating layer d, respectively from inside to outside. In the drawing, intersections of the four rays and the inner contour line of the coating layer a are A1~A4, and intersections of the four rays and the outer contour line of the coating layer a are B1~B4, that is, inner intersections of the coating layer a are A1~A4, and outer intersections are B1~B4. Accordingly, the coating layer a corresponds to four intersections, which are B1-A1, B2-A2, B3-A3 and B4-A4, respectively. The thickness of the coating layer a is the average of the four intersections, that is, (B1−A1+B2−A2+B3−A3+B4−A4)/4. Similarly, the thicknesses of the coating layers b, c and d are (C1−B1+C2−B2+C3−B3+C4−B4)/4, (D1−C1+D2−C2+D3−C3+D4−C4)/4, (E1−D1+E2−D2+E3−D3+E4−D4)/4, respectively.

According to another embodiment, a radius of the each contour line may be fitted, and the thickness of the coating layer is taken as the difference between a radius of the outer contour line and a radius of the inner contour line. For example, as shown in FIG. 6, if a fitted radius of five contour lines of the measurable particle is R1~R5, respectively, from inside to outside, the thicknesses of the coating layer a~d are R2-R1, R3-R2, R4-R3 and R5-R4, respectively.

After the step S340, the thickness of the each coating layer of the measurable particle may be measured.

According to one embodiment, the method 300 also includes steps of: storing the captured images and the measured relevant data during detection in a database. The captured images include, but are not limited to, an image of the surface at the first magnification, an image of the surface in which the measurable particles are marked, and an image of the section at the second magnification and so on, but are not limited to these. The relevant data includes, such as, data about the thicknesses of the coating layers, center coordinates of the each measurable particle and so on, but is not limited thereto.

Those skilled in the art may choose to store part or all of the images and relevant data involved in the detection process according to the actual needs. The present invention does not limit the specific data content stored into the database. For example, those skilled in the art may choose to store the image of the section and the data of the measured thickness of the each coating layer of the measurable particle in the database. Based on the stored data of the thickness, a statistical value of thicknesses of coating layers of nuclear fuel particles in a certain batch may be calculated, such as data of a maximum, a minimum, an average value, a variance and a standard difference, etc. of thicknesses of all coating layers, but is not limited thereto.

Figure 7:
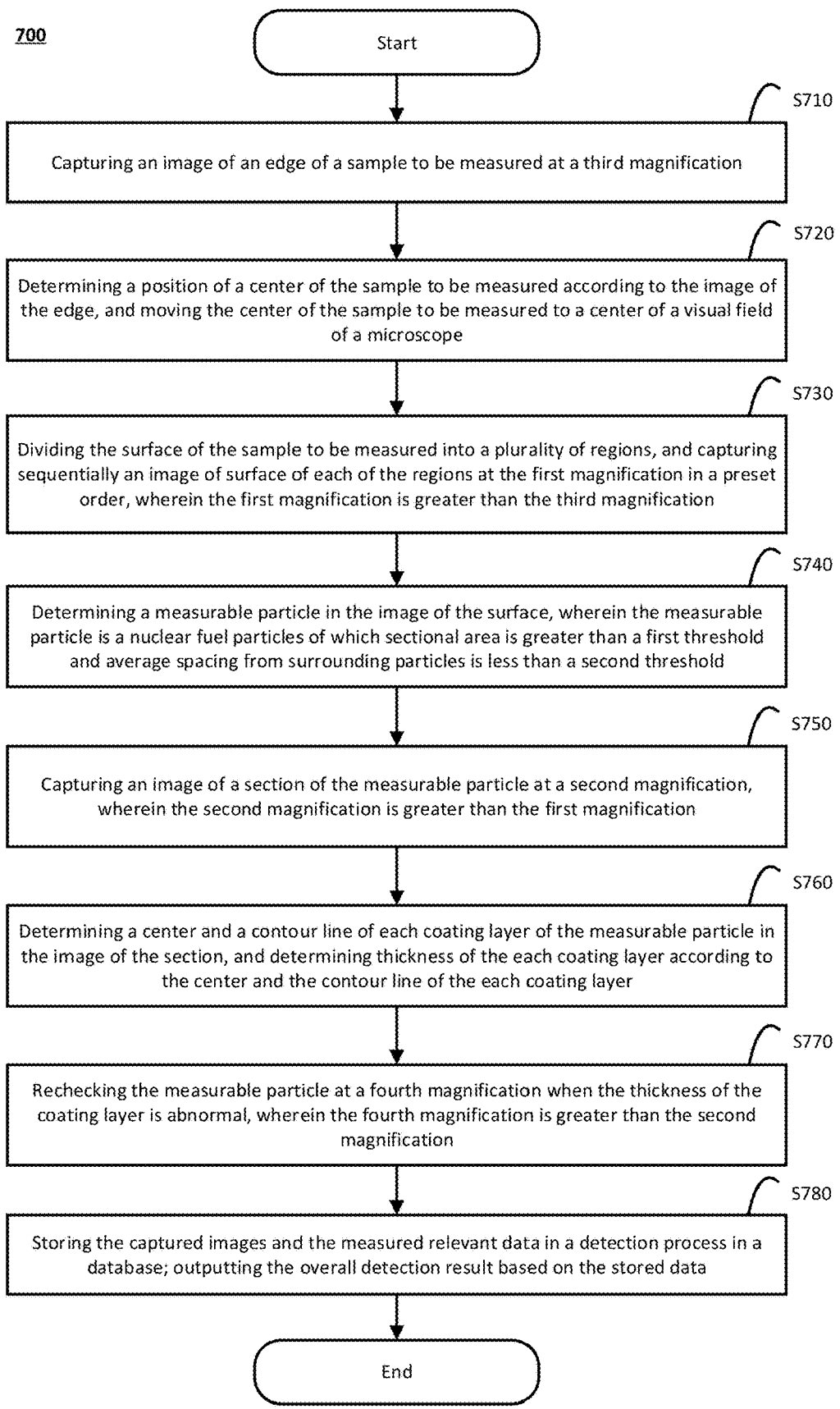
FIG. 7 shows a flowchart of a method 700 for detecting thicknesses of coating layers of nuclear fuel particles according to another embodiment of the present invention.

FIG. 7 shows a flowchart of a method 700 for detecting thicknesses of coating layers of nuclear fuel particles according to another embodiment of the present invention. The method 700 is performed by the device 100 for detecting the thicknesses of the coating layers of the nuclear fuel particles described as above. Compared with the above-mentioned method 300, the nuclear fuel particles detected by the method 700 are more comprehensive and the detection process is more automatic. As shown in FIG. 7, method 700 starts at step S710.

In the step S710, an image of an edge of a sample to be measured is captured at a third magnification.

It should be noted that, in the image of the edge captured at the third magnification, it should be possible to show an arc edge of the sample to be measured. The present invention does not limit the specific value of the third magnification, and those skilled in the art may select an objective lens with an appropriate magnification according to an actual size of the sample to be measured, so that the arc edge of the sample to be measured may be displayed in the image of the edge. For example, in one embodiment, an objective lens with a diameter of an imaging visual field of about 8 mm and a magnification of 2× (i. e. the third magnification is 2) may be used.

Figure 8:
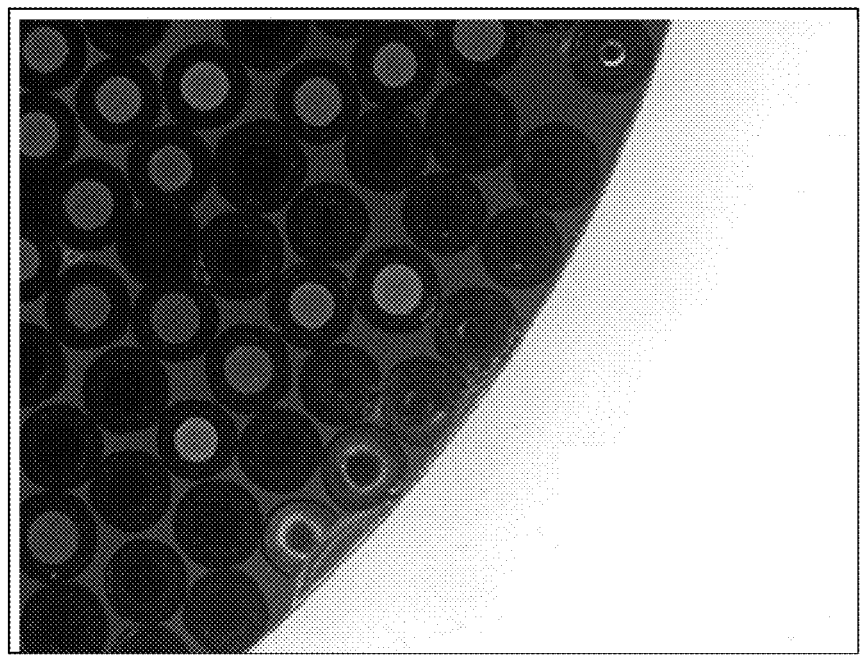
FIG. 8 shows a schematic diagram of an image of an edge of a sample to be measured, captured at a third magnification according to an embodiment of the present invention.

Specifically, in the step S710, the sample to be measured is fixed on the electronic control objective table 112 through a structure such as a glass slide, a fixture and so on. Then, according to program instructions preset in the computing apparatus 130, the electronic control converter 111 is automatically adjusted to switch the objective lens directly facing the objective table to an objective lens with the third magnification. The position of the electronic control objective table 112 is automatically adjust to move the sample to be measured into the visual field of the objective lens, and automatic focusing is carried out, so that the industrial camera 120 may show a clear image of the surface of the sample to be measured. Then, the industrial camera 120 captures the image of the edge of the sample to be measured, and transmits the captured image of the edge to the computing apparatus 130 for analysis and processing. FIG. 8 shows one example of an image of an edge captured at the third magnification.

In step S720, a position of the center of the sample to be measured is determined according to the image of the edge, and the center of the sample to be measured is moved to the center of a visual field of the microscope.

According to one embodiment, the computing apparatus 130 may adopt a contour extraction algorithm to extract an arc contour of the edge of the sample to be measured, and a circle is adopted to fit the edge of the sample to determine the position of its center (the center of the circle) and radius. Those skilled in the art may understand that the center of the sample to be measured determined by circular fitting may be located at outside of a pixel coordinate range of the image of the edge. Then, the position of the electronic control objective table 112 is adjusted to move the center of the sample to be measured, to the center of the visual field of the microscope.

Then, in the step S730, the surface of the sample to be measured is divided into a plurality of regions, and at the first magnification, an image of surface of each of the regions is captured sequentially in a preset order, wherein the first magnification is greater than the third magnification.

By capturing sequentially images of the surfaces of the respective regions at the first magnification, the comprehensive detection of the sample to be measured may be embodied. It should be noted that the present invention does not limit the region division method (the number and size of regions, etc.) of the surfaces of the sample to be measured and the acquisition sequence of the images of the respective regions. Preferably, sections of a plurality of nuclear fuel particles should be included in each region.

Figure 9:
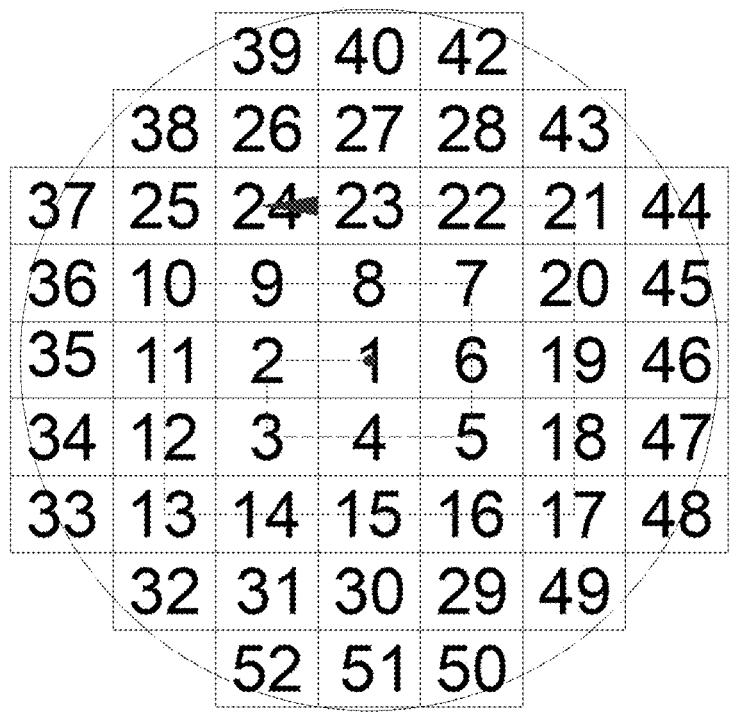
FIG. 9 shows a schematic diagram of region division of a surface of a sample to be measured according to an embodiment of the present invention.

According to one embodiment, the surface of the sample to be measured may be divided into a plurality of equal regions, and the images of the surfaces of the respective regions may be captured sequentially at a magnification of 1, starting from a central region, in a clockwise or counterclockwise order. For example, as shown in FIG. 9, the surface of the sample to be measured is divided into 52 rectangular regions, and starting from a central region 1, images of the surfaces of respective regions are captured sequentially at the first magnification, in a counterclockwise direction. For each region, it is necessary to in accordance with the following steps S740 to S780 to determine a measurable particle in this area and detect the thickness of each coating layer of the measurable particle, so as to embody comprehensive detection of the samples to be measured.

Then, in the step S740, a measurable particle in the image of the surface is determined, wherein the measurable particle is a nuclear fuel particle of which sectional area is greater than a first threshold and average spacing with surrounding particles is less than a second threshold.

Then, in the step S750, an image of a section of the measurable particle is captured at the second magnification, wherein the second magnification is greater than the first magnification.

Then, in the step S760, a contour line of each coating layer in the image of the section and a center of the measurable particle are determined, and the thickness of the each coating layer is determined according to the center and contour line of the each coating layer.

The steps S740~S760 are the same as the steps S320~S340. The specific embodiments of the steps S740~S760 may refer to the related description of the steps S320~S340, and will not be repeated here.

Then, in the step S770, when the thickness of the coating layer is abnormal, the measurable particle is rechecked at the fourth magnification, wherein the fourth magnification is greater than the second magnification.

In the step S770, whether the thickness of the coating layer is abnormal is judged, when the thickness of the coating layer is abnormal, the corresponding measurable particle is rechecked. A judgment criterion of abnormality may be set by those skilled in the art, and the present invention does not limit to it. In one embodiment, the determination criterion of abnormality may be set as: an absolute value of a difference between the thickness of one coating layer of the measurable particle and an average value of thickness of the same coating layer of other measurable particles is greater than a third threshold. For example, the measurable particle P includes four coating layers of a~d, wherein thickness of coating layer a is tha; an average value of thickness of the coating layer a of other measurable particles is $\overline{tha}$, and when $|tha-\overline{tha}|$ is greater than the third threshold, it is judged that data of the thickness of the coating layer a of the measurable particle P is abnormal, and it is necessary to recheck the measurable particle P. The value of the third threshold may be set by those skilled in the art, and the present invention does not limit to this.

According to one embodiment, the measurable particle may be rechecked in accordance with the following steps:

An image of a local section of the measurable particle is captured at the fourth magnification, wherein the fourth magnification is larger than the second magnification described as above; the center and the contour line of the each coating layer of the measurable particle in the image of the local section are determined, and one ray is made from the center, which intersects with each contour line at each point, respectively; an intersection distance corresponding to a coating layer is taken as the thickness of this coating layer.

Figure 10:
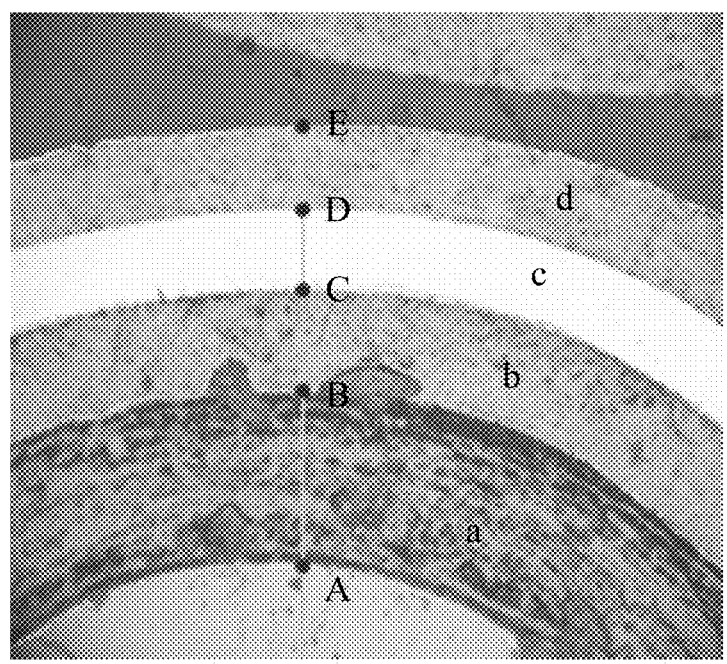
FIG. 10 shows a schematic diagram of a image of a local section of a measurable particle captured at a fourth magnification according to an embodiment of the present invention.

It should be noted that the fourth magnification is larger than the second magnification described as above, and only a local edge of a single measurable particle may be shown in the image of the local section captured at the fourth magnification. The present invention does not limit the specific value of the fourth magnification. Those skilled in the art may select an objective lens with an appropriate magnification according to an actual size of the nuclear fuel particle, so that only the local edge of the measurable particle may be shown in the image of the local section. For example, in one embodiment, a diameter of the fuel particle is about 1 mm, and accordingly, an objective lens with a diameter of an imaging visual field of about 0.4 mm and a magnification of 40× (i. e., the fourth magnification is 40) may be used, and at this time, only a local edge of one measurable particle is contained in the image of the local section of the measurable particle captured by the industrial camera. FIG. 10 shows one example of an image of a local section captured at the fourth magnification.

After the image of the local section is captured, the center and the contour line of each coating layer of the measurable particle are determined in the image of the local section, and one ray is made from the center, which intersects with each contour line at each point. An intersection distance corresponding to a coating layer is taken as the thickness of this coating layer.

According to one embodiment, a contour extraction algorithm may be used to extract the arc edge contour of edge of each coating layer of the measurable particle, and a circular is adopted to fit the arc edge so as to determine the position of its center (the center of the circle). Those skilled in the art may understand that the center of the sample to be measured determined by circular fitting may be located at outside of a pixel coordinate range of the image of the local section. Then, one ray may be made from the center, which intersects with each contour line at each point; an intersection distance corresponding to a coating layer is taken as the thickness of this coating layer. For example, as shown in FIG. 10, one ray is made from the center (outside the image), which intersects with each contour line at five points A~E. Accordingly, the thicknesses of the coating layer a~d are B-A, C-B, D-C and E-D, respectively.

According to another embodiment, the radius of each contour line may be fitted, and the difference between the radius of an outer contour line and the radius of an inner contour line of a coating layer is taken as the thickness of this coating layer. For example, in the example shown in FIG. 10, if the fitted radii of five contour lines of a measurable particle from inside to outside are R1~R5 respectively, and the thicknesses of the coating layers A~D are R2-R1, R3-R2, R4-R3 and R5-R4, respectively.

Then, in the step S780, the captured images and the measured relevant data in the detection process are stored in a database; the overall detection result is output based on the stored data.

The images captured during the detection process include, but are not limited to, an image of the edge at the third magnification, an image of the surface of each region at the first magnification, an image of the surface of each region in which the measurable particles are marked, an image of the section at the second magnification, an image of the local section at the fourth magnification and so on. The relevant data includes, such as, data about the thicknesses of the coating layers, center coordinates of the each measurable particle and so on, but is not limited to thereto.

Those skilled in the art may choose to store part or all of the images and relevant data involved in the detection process according to the actual needs. The present invention does not limit the specific data content stored into the database. For example, those skilled in the art may choose to store the image of the section and the data of the measured thickness of the each coating layer of the measurable particle in the database.

In addition, it should be noted that although the step S780 is the last step of the method 700 in the embodiment shown in FIG. 7, those skilled in the art may understand that the data storage process usually runs through the whole thickness detection process, that is, during the execution of the steps S710~S770, every time an image or relevant data that needs to be stored is generated, it is immediately stored in the database, without waiting for all steps to be performed before storing the related data.

Based on the data stored in the database, an overall detection result may be obtained statistically. The data of the detection result, for example, includes: the number of the fuel particles on the sample to be measured, a ratio of the measurable particles, thickness of each coating layer of a single fuel particle, average thickness of each coating layer of the fuel particles, thickness distribution of the coating layers, thickness deviation range of the coating layers, and the corresponding judgment data output according to the measured result (for example, whether a certain batch of nuclear fuel particles meets the requirements, etc.) and so on, but not limited to thereto.

The scheme for detecting thicknesses of coating layers of nuclear fuel particles of the present invention implements automatic detection of the thickness of the each coating layer, and compared with the existing technology, the degree of automation, measurement efficiency and measurement accuracy have been greatly improved, which can provide more accurate measurement data for nuclear reactor parts and avoid radiation damage to detection workers.

The various techniques described herein can be implemented in conjunction with hardware or software, or a combination thereof. Thus, the method and apparatus of the present invention, or certain aspects or portions of the method and apparatus of the present invention, may take the form of program codes (i.e., instructions) embedded in a tangible medium, such as a removable hard disk, a USB flash stick, a floppy disk, a CD-ROM, or any other forms of machine-readable storage medium, wherein, programs, when are loaded into a machine such as a computer, and executed by the machine, the machine becomes an apparatus for practicing the present invention.

In a case of the program codes being executed on a programmable computer, the computing apparatus typically includes a processor, a storage medium readable by the processor (including a volatile memory, a nonvolatile memory and/or a storage element), at least one input device, and at least one output device. Wherein the memory is configured to store program codes; the processor is configured to execute the method for detecting the thicknesses of the coating layers of the nuclear fuel particles of the present invention according to the instructions in the program codes stored in the memory.

By way of example and not limitation, the readable medium includes readable storage medium and communication medium. The readable storage medium store information such as computer readable instructions, data structures, program modules, or other data and so on. The communication medium typically embodies computer readable instructions, data structures, program modules or other data in a modulated data signal such as a carrier wave or other transport mechanism, and includes any information delivery medium. Combinations of any of the above are also included within the scope of the readable medium.

In the specification provided herein, algorithms and displays are not inherently related to any specific computer, virtual system, or other apparatuses. Various general purpose systems may also be used with the examples of the present invention. A structure required to construct such a system is apparent from the above description. Furthermore, the present invention is not directed to any specific programming language. It is to be understood that various programming languages may be used to implement the contents of the present invention described herein, and that the descriptions of specific languages above are intended to disclose the best mode for carrying out the present invention.

A large number of specific details are described in the specification provided herein. However, it can be understood that, the embodiments of the present invention can be practiced without these specific details. In some examples, well-known methods, structures and techniques are not shown in detail so as not to obscure the understanding of this specification.

Similarly, it should be understood that, in order to simplify the present disclosure and help understand one or more of various invention aspects, in the above description of the exemplary embodiments of the present invention, various features of the present invention are sometimes grouped together into a single embodiment, figure, or description thereof. However, the disclosed method should not be interpreted to reflect an intention that the claimed invention claims more features than those explicitly recorded in each claim. More precisely, as reflected in the following claims, aspects of the invention lie in less than all the features of the single embodiment disclosed above. Therefore, the claims following the detailed description are hereby expressly incorporated into this detailed description, wherein each claim itself is a separate embodiment of the present invention.

Those skilled in the art should understand that the modules or units or components of the apparatus in the example disclosed herein may be arranged in the apparatus as described in the embodiment, or alternatively may be located in one or more apparatuses different from the apparatus in the example. The modules in the preceding example may be combined into one module or, in addition, may be divided into a plurality of sub modules.

Those skilled in the art can understand that the modules in the apparatus in the embodiments can be adaptively changed and provided in one or more apparatuses different from the embodiments. The modules or the units or the components in the embodiments may be combined into one module or unit or component, and in addition, they may be divided into a plurality of sub modules or sub units or sub components. Except that at least some of such features and/or procedures or units are mutually exclusive, all features disclosed in this specification (including accompanying claims, abstract and drawings) and all procedures or units of any method or apparatus disclosed as such may be combined in any combination. Each feature disclosed in the present specification (including accompanying claims, abstract and drawings) may be replaced by an alternative feature providing the same, equivalent or similar purpose unless otherwise expressly stated.

In addition, those skilled in the art can understand that, although some embodiments described herein include some features included in other embodiments rather than other features, the combination of features of different embodiments means that they are within the scope of the present invention and form different embodiments. For example, in the following claims, any one of the claimed embodiments can be used in any manner of combination.

In addition, some of the embodiments are described herein as a method or combination of method elements that can be implemented by a processor of a computer system or by other devices performing the functions. Therefore, a processor having the necessary instructions for implementing the method or the method elements forms a device for implementing the method or the method elements. In addition, the elements of embodiments of the device described herein are examples of devices for implementing functions performed by elements for the purpose of implementing the invention.

As used herein, unless otherwise specified, describing ordinary objects using ordinal words "first", "second", "third" and so on only represents different instances involving similar objects, and is not intended to imply that the objects described as such must have a given order in time, space, ranking or in any other manner.

Although the present invention has been described according to a limited number of embodiments, benefiting from the above description, those skilled in the art understand that other embodiments can be envisaged within the scope of the invention described thereby. In addition, it should be noted that the language used in this specification is selected mainly for the purpose of readability and teaching, rather than for the purpose of explaining or defining the subject matter of the present invention. Therefore, many modifications and changes will be apparent to those skilled in the art without departing from the scope and spirit of the appended claims. For the scope of the present invention, the disclosure of the present invention is illustrative, rather than restrictive, and the scope of the present invention is limited by the appended claims.

What is claimed is:

1. A method for determining thicknesses of coating layers of nuclear fuel particles, comprising:
   capturing an image of a surface of a sample to be measured, at a first magnification,
      the surface of the sample to be measured including sections of a plurality of nuclear fuel particles having coating layers;
   for a nuclear fuel particle in the image of the surface,
      determining integrity of the nuclear fuel particle by determining that a cross-sectional area of the nuclear fuel particle is greater than a first threshold,
      determining a grinding state of the nuclear fuel particle by determining that an average spacing between the nuclear fuel particle and surrounding particles is less than a second threshold, and
      determining that the nuclear fuel particle is a measurable particle based on
         the cross-sectional area being greater than the first threshold and
         the average spacing from the surrounding particles being less than the second threshold;
   capturing an image of a cross-section of the measurable particle at a second magnification,
      wherein the second magnification is greater than the first magnification;
   determining a center and a contour line of each coating layer of the measurable particle in the image of the cross-section, and
   determining thickness of the each coating layer according to the center and the contour line of the each coating layer.

2. The method according to claim 1, before the capturing of the image of the first surface of the sample to be measured, further comprises:
   capturing an image of an edge of the sample to be measured, at a third magnification, wherein the third magnification is less than the first magnification;
   determining a position of a center of the sample to be measured according to the image of the edge, and moving the center of the sample to be measured to a center of a visual field of a microscope.

3. The method according to claim 1, wherein the capturing of the image of the surface of the sample to be measured, at the first magnification comprises:
   dividing the surface of the sample to be measured into a plurality of regions, and capturing sequentially an image of surface of each of the regions at the first magnification in a preset order.

4. The method according to claim 3, wherein the surface of the sample to be measured is divided into the plurality of equal regions, and the image of the surface of each of the regions is captured sequentially at the first magnification, starting from a central position of the sample to be measured, in a clockwise or anticlockwise order.

5. The method according to claim 1, wherein the determining of the thickness of the each coating layer according to the center and the contour line of the each coating layer comprises:
   making at least one ray from the center, the ray intersecting each contour line at each point, respectively;
   taking an average value of intersection distances corresponding to a coating layer as the thickness of this coating layer, wherein the intersection distance is a distance between an outer intersection and an inner intersection, the outer intersection being an intersection of the ray and an outer contour line of the coating layer, and the inner intersection being an intersection of the ray and an inner contour line of the coating layer.

6. The method according to claim 5, wherein two mutually perpendicular straight lines are made across the center, the straight lines intersecting with each contour line at each point, respectively;
   taking the average value of the intersection distances corresponding to the coating layer as the thickness of this coating layer.

7. The method according to claim 1, wherein, after the determining of the thickness of the each coating layer according to the center and the contour line of the each coating layer, further comprises:
   judging whether the thickness of the coating layer is abnormal;
   rechecking the measurable particle when the thickness of the coating layer is abnormal.

8. The method according to claim 7, wherein the rechecking of the measurable particle comprises:
   capturing an image of a local section of the measurable particle at a fourth magnification, wherein the fourth magnification is greater than the second magnification;
   determining a center and contour line of the each coating layer of the measurable particle in the image of the local section, and making one ray from the center, the ray intersecting with each contour line at each point, respectively;
   taking an intersection distance corresponding to a coating layer as the thickness of this coating layer.

9. The method according to claim 7, wherein the abnormal comprises:
   an absolute value of a difference between a thickness of one coating layer of the measurable particle and an average value of thickness of the same coating layer of other measurable particles is greater than a third threshold.

10. The method according to claim 1, further comprises:
    storing the captured images and the measured relevant data in a detection process in a database.

* * * * *